United States Patent
Kumar et al.

(10) Patent No.: US 9,983,982 B1
(45) Date of Patent: May 29, 2018

(54) TESTING SOFTWARE CODE IN A PRODUCTION ENVIRONMENT

(71) Applicant: VISA INTERNATIONAL SERVICE ASSOCIATION, San Francisco, CA (US)

(72) Inventors: Surjeet Kumar, Campbell, CA (US); Aloysius John, San Jose, CA (US); Biju Abraham, Fremont, CA (US); Soorej Nair, San Jose, CA (US); Priya Nanduri, Sunnyvale, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days. days.

(21) Appl. No.: 15/398,579

(22) Filed: Jan. 4, 2017

(51) Int. Cl.
  *G06F 9/44* (2006.01)
  *G06F 11/36* (2006.01)

(52) U.S. Cl.
  CPC .............. *G06F 11/368* (2013.01); *G06F 8/71* (2013.01); *G06F 11/3688* (2013.01)

(58) Field of Classification Search
  CPC .................................................. G06F 11/368
  USPC ........................................................ 717/124
  See application file for complete search history.

(56) References Cited

U.S. PATENT DOCUMENTS

| 7,818,759 | B2 * | 10/2010 | Ahmed | G06F 9/54 |
| | | | | 719/328 |
| 2010/0190439 | A1 * | 7/2010 | Huang | H04L 67/12 |
| | | | | 455/41.2 |
| 2013/0174126 | A1 | 7/2013 | Belihomji et al. | |
| 2013/0191517 | A1 | 7/2013 | Ling et al. | |
| 2013/0346799 | A1 | 12/2013 | Warren et al. | |
| 2015/0268975 | A1 * | 9/2015 | Du | G06F 9/455 |
| | | | | 703/23 |

(Continued)

FOREIGN PATENT DOCUMENTS

EP  2270664  1/2011

OTHER PUBLICATIONS

International Search Report and Written Opinion dated Mar. 12, 2018, in connection with PCT International Application No. PCT/US2017/064194 (10 pages).

*Primary Examiner* — Evral E Bodden
(74) *Attorney, Agent, or Firm* — Kilpatrick Townsend & Stockton LLP

(57) ABSTRACT

Embodiments of the invention are directed to techniques for redirecting data streams from a production environment to validate non-production software code. In some embodiments, a front-end computer executing a first version of software can receive a request message from a requesting computer, generate a request payload using the request message, transmit the request payload to a processor computer, receive a response payload from the processor computer, generate a reply message using the response payload, and provide, to a validation computer that is executing a second version of the software, the request message, the request payload, and the response payload. The validation computer can generate a modified request payload using the request message and a modified reply message using the response payload. To detect potential errors in the second version, the modified request payload is compared with the request payload and the modified reply message is compare with the reply message.

20 Claims, 7 Drawing Sheets

(56) References Cited

U.S. PATENT DOCUMENTS

2015/0373813 A1\* 12/2015 Nieuwlands ....... H05B 37/0245
  315/294
2016/0028598 A1  1/2016 Khakpour et al.

\* cited by examiner

TESTING SOFTWARE CODE IN A PRODUCTION ENVIRONMENT

BACKGROUND

Within the context of online services (e.g., web services), robust error-free code may be critical. In particular, clients of an online service may include businesses and other organizations whose operations are reliant upon the online service's uptime and provision of correct output. Accordingly, prior to deploying an online service, it is common to first submit the online service's coded implementation to a period of testing within a non-production environment (e.g., a beta testing environment) before pushing the code to production. During the testing period, developers may attempt to reduce the number of bugs within the code by applying a suite of tests (e.g., regression tests, unit tests) against the code to identity bugs. Once the code is able to pass all the tests without producing any errors, the online service may be launched by deploying the code to the production environment. Moreover, if the online service is continually updated with new features and other changes, this testing-before-deployment process may be repeated for each incoming version of the online service.

One shortcoming with using a non-production environment to test code is that the test suite applied against the code may be significantly limited in scope. Because developer time is often needed to create, configure, and continually update test cases or test data, testing suites may often only focus on a minor sample of all possible situations or inputs that the online service may encounter in production. As a result, even if the code is able to pass all of the tests that are applied in the controlled environment, the code is likely unable to handle many of the possible edge cases that could be encountered in the wild.

Embodiments of the present invention address these problems and other problems individually and collectively.

BRIEF SUMMARY

Embodiments of the invention are directed to software validation and testing in production environments. More specifically, embodiments of the invention are directed to techniques for redirecting data streams from a production environment to validate production code that is not in the execution path.

For example, an online service may receive, from one or more clients, messages following a first message format (i.e., input messages), convert the input messages to message following a second message format (i.e., output messages), and transmit the output messages to one or more recipients. When it comes time to upgrade the online service to a new version of the online service, the modified version of the software code that implements the online service may need to be thoroughly tested for all potential real-life error scenarios before the modified version can be pushed to the production environment.

Hence, some embodiments of the invention enable the modified version of the software code to be tested in the production environment, where a validation server executes the modified version of the software code in coordination with a front-end server that executes the production version of the software code. The production version of the software code may still receive the input messages from the clients and transmit the output messages to the recipients. However, for each input message that is received, in addition to generating and transmitting the output message, the front-end server may asynchronously provide the input message and the output message to the validation server. Using the input message, the modified version of the software code can produce a modified output message. The validation server can then compare the output message with the modified output message to make sure that the modified version of the software code is mapping and transforming the fields correctly. Any identified discrepancies between the two messages may correspond to potential errors in the modified version of the software code. The identified discrepancies can be logged and the developers may use the logged information to determine which discrepancies actually correspond to an error in the modified version of the software code. In some embodiments, the logged information may automatically trigger monitoring and alert mechanisms.

One embodiment of the invention is directed to a method. The method can comprise: receiving, from a requesting server computer over a first network, a request message at a front-end computing device, the front-end computing device executing a first version of a software code; generating, by the front-end computing device, a request payload using the request message, the request payload having a plurality of request-payload fields; transmitting, by the front-end computing device, the request payload to a processor computer over a second network; receiving, by the front-end computing device, from the processor computer over the second network, a response payload; generating, by the front-end computing device, a reply message using the response payload for sending to the requesting server computer, the reply message having a plurality of reply-message fields; providing, by the front-end computing device to a validation computing device executing in coordination with the front-end computing device, the request message, the request payload, and the response payload, the validation computing device executing a second version of the software code; generating, by the validation computing device, a modified request payload using the request message, the modified request payload having a plurality of modified request-payload fields; comparing the plurality of modified request-payload fields of the modified request payload with the plurality of request-payload fields of the request payload to identify discrepancies between the modified request payload and the request payload corresponding to potential errors in the second version of the software code; generating, by the validation computing device, a modified reply message using the response payload, the modified reply message having a plurality of modified reply-message fields; and comparing the plurality of modified reply-message fields with the plurality of reply-message fields to identify discrepancies between the modified reply message and the reply message corresponding to potential errors in the second version of the software code.

These and other embodiments of the invention are described in detail below. For example, embodiments are directed to systems and computer readable media associated with methods described herein.

TERMS

Figure 1:
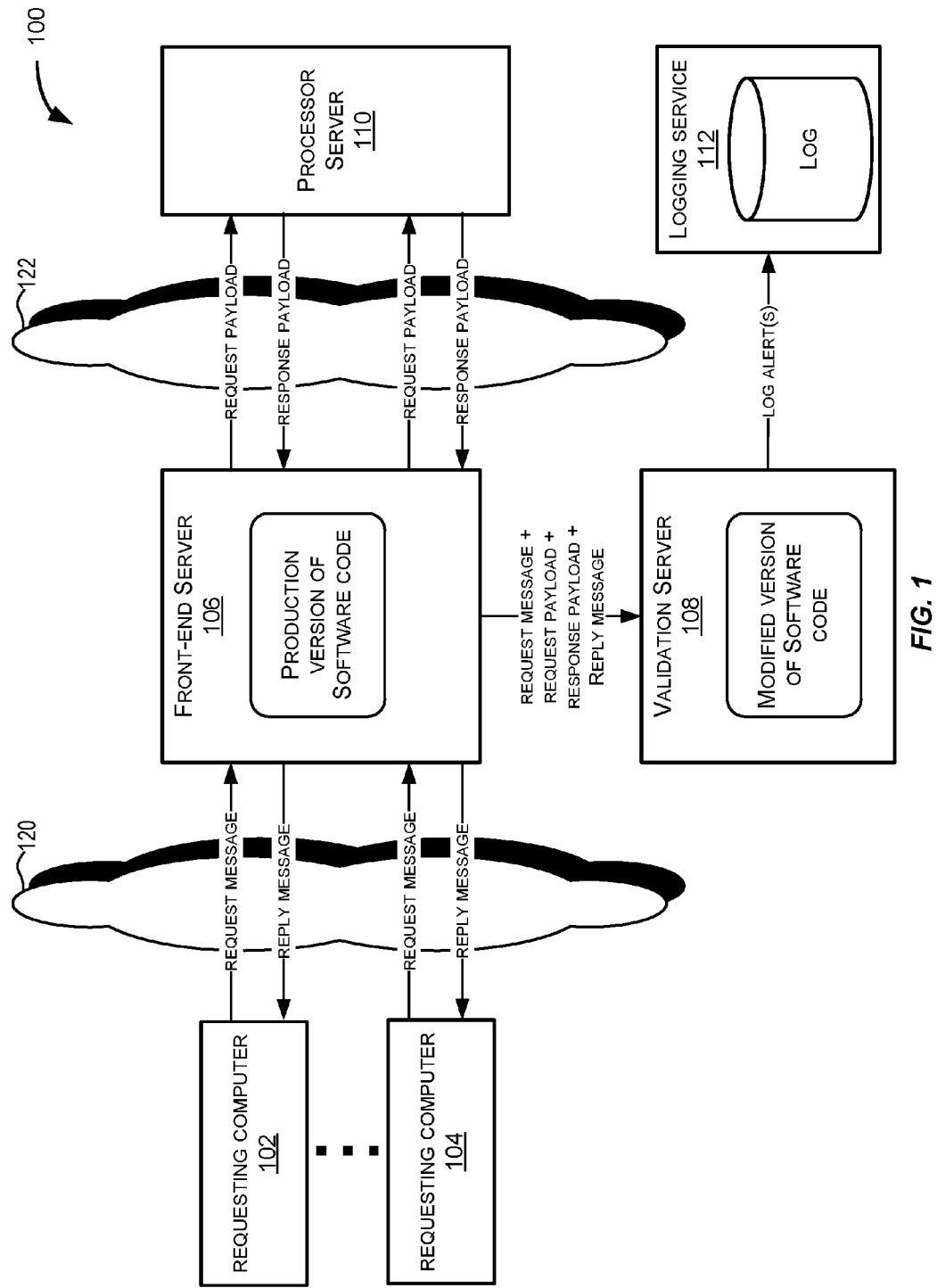
FIG. 1 illustrates a high-level block diagram of a production environment in accordance with embodiments.

Prior to discussing embodiments of the invention, a further description of some terms may be helpful in understanding embodiments of the invention.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

A "processor" may include hardware within a server computer (or other computing device) that carries out instructions embodied as code in a computer-readable medium. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

An "authorization request message" may include an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a consumer payment device or payment account. An authorization request message may also comprise additional data elements corresponding to identification information including, by way of example only: a service code, a CVV/iCW (card verification value), a dCW (dynamic card verification value), a cryptogram (e.g., a unique cryptographic value for the transaction), an expiration date, etc. An authorization request message may also comprise transaction information, such as any information associated with a current transaction, such as the transaction amount, merchant identifier (e.g., MW), merchant location, merchant category code, etc., as well as any other information that may be utilized in determining whether to authorize a transaction.

An "authorization response message" may include an electronic message reply to an authorization request message generated by an issuing financial institution or a payment processing network. An authorization response message according to some embodiments may comply with ISO 8583. An authorization response message may include, by way of example only, one or more of the following status indicators: Approval—transaction was approved; Decline—transaction was not approved; or Call Center—response pending more information, merchant must call the toll-free authorization phone number. The authorization may also include "identification information" as described above. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As described below, in some embodiments, a payment processing network may generate or forward the authorization response message to a gateway, merchant, or an acquirer of the merchant.

DETAILED DESCRIPTION

Embodiments of the invention are directed to software validation and testing. More specifically, embodiments of the invention are directed to techniques for redirecting data streams from a production environment to validate non-production software code.

For example, an online service may receive, from one or more clients, messages following a first message format (i.e., input messages), convert the input messages to message following a second message format (i.e., output messages), and transmit the output messages to one or more recipients. In systems where message formats involve large numbers of message fields, converting messages between different message formats may involve a significant number of complex logic and field validations. As a result, when it comes time to upgrade the online service to a new version of the online service, the modified version of the software code that implements the online service may need to be thoroughly tested for errors before the modified version can be pushed to the production environment. Otherwise, seemingly minor mistakes produced by the upgraded online service may compound downstream into significant disruptions that negatively affect clients of the online service. Such disruptions can be especially problematic for online services that service large volumes of requests (e.g., where each client may potentially produce millions of requests) or high request rates. In such situations, the correctness of the modified version of the software code may be so critical that testing the code in a controlled environment may not suffice.

Hence, some embodiments of the invention enable the modified version of the software code to be tested in the production environment, where a validation server executes the modified version of the software code in coordination with a front-end server that executes the production version of the software code. Note that in this example, the production version of the software code may still receive the input messages from the clients and transmit the output messages to the recipients. However, for each input message that is received, in addition to generating and transmitting the output message, the front-end server may asynchronously provide the input message and the output message to the validation server. Using the input message, the modified version of the software code produces a modified output message. The validation server then compares the output message with the modified output message to make sure that the modified version of the software code is mapping and transforming the fields correctly. In some embodiments, the comparison of the output message with the modified output message comprises one or more string comparisons. In these string comparisons, certain fields within the messages that are known to be dynamic in nature (e.g., timestamps) may be masked, which may reduce the number of false positives.

Any identified discrepancies between the two messages may correspond to potential errors in the modified version of the software code. The identified discrepancies can be logged, and the developers may use the logged information to determine which discrepancies actually correspond to an error in the modified version. Any identified errors in the modified version can then fixed. The modified version of the software code may continue to execute while receiving, as input, the stream of data from the production environment. After a predefined period of time (e.g., a month) where the modified version of the software code has processed production environment data without producing any discrepancies, the modified version may be considered error-free. Accordingly, the production version of the software code may be replaced by the modified version of the software code.

Exposing the modified version of the software code to production environment data over a period of time may enable developers to identify a larger sample of possible input that relative to that provided by most test suites. Additionally, because the production version of the software code is able to execute simultaneously with the modified version, the production version may shield clients of the online service from any errors produced by the modified version until the modified version is deemed ready to take over and be used in production.

I. System for Testing Software Code in Production Environment

An exemplary system 100 for redirecting production data streams of a production environment to validate non-production software code can be seen in FIG. 1 The system 100 includes requesting computers 102-104, a front-end server 106, a validation server 108, a processor server 110, a logging service 112, and communication networks 120-122.

FIG. 1 shows the requesting computers (i.e., requesting server computers) 102-104 each transmitting a request message to the front-end server 106. The request message can be for various purposes and take various forms. Regardless of the form, the request may be transformed by the front-end server 106 for providing to a processor server 110, which provides a response to the request. Validation server 108 can be used to validate a new version of software code running on the front-end server 106.

Accordingly, before reaching its intended recipient(s) (e.g., an authorization server), the request may pass through one or more intermediary servers, which may include the front-end server 106 and the processor server 110. When a request reaches an intermediary server, the intermediary server may introduce one or more transformations to the request prior to passing on the request. For example, as shown in FIG. 1, when the front-end server 106 receives a request message from one of the requesting computers 102-104, the front-end server 106 may generate a request payload from the request message and transmit the request payload to the processor server 110.

In some embodiments, intermediary servers may be configured to receive messages in different message formats (e.g., the intermediary servers may not all belong the same organization). For example, while the front-end server 106, the validation server 108, and the logging service 112 may be considered part of an organization's (e.g., corporation) production environment, the requesting computers 102-104, the processor server 110, the resource computer, and the authorization server may be considered to be external to the production environment (e.g., external to one or more firewalls or network address translation (NAT) tables).

Accordingly, multiple incompatible message formats may be used within the system 100. For example, the request message received by the front-end server 106 may have one or more request message fields (e.g., API fields), and the front-end server 106 may be configured to receive messages having the one or more request message fields. However, the processor server 110 may be configured to receive a request payload that has one or more request payload fields, where the one or more request message fields are different (e.g., more fields, less fields, different ordering or organization of fields, different types of fields) from the one or more request payload fields. Thus, intermediary servers may be configured to transform messages from one message format to another. For example, to facilitate the request reaching the intended recipient(s), the front-end server 106 may generate a request payload having the one or more request payload fields from the request message and send the request payload to the processor server.

The requesting computers 102-104 may correspond to computing devices that are each communicatively coupled to the communication network 120 and are each configured to send requests to access resources managed by the resource computer. In some embodiments, the requesting computers 102-104 may each be configured to format such requests into request messages having the one or more request message fields and transmit the request messages to the front-end server 106. The requesting computer 102-104 may be configured to receive responses to their requests, where a response that is received in response to a request can indicate whether the request is approved or denied. In particular, the requesting computers 102-104 may each be configured to receive reply messages that each has one or more reply message fields. In some embodiments, each requesting computer, including requesting computers 102-104, may be associated with a requester identifier that can be used to uniquely identify the requesting computer to the front-end server 106.

The requesting computers 102-104 may communicate with the front-end server 106 over the communication network 120. The front-end server 106 may communicate with the processor server 110 over the communication network 122. The communication networks 120-122 can be of various types and can include one or more communication networks. Examples of the communication networks 120-122 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication networks 120-122 may include any communication network or infrastructure that facilitates communications between computing devices The front-end server 106 may be communicatively coupled to the communication network 120 and to the communication network 122. Over the communication network 120, the front-end server 106 may be configured to receive request messages from and transmit reply messages to a plurality of requesting computers including the requesting computers 102-104. Over the communication network 122, the front-end server 106 may be configured to transmit request payloads to and receive response payloads from one or more processor servers including the processor server 110. For example, the front-end server 106 may receive a request message from the requesting computer 102, generate a request payload from the request message, transmit the request payload to the processor server 110, receive a response payload that is sent in response to the request payload from the processor server 110, generate a reply message from the response payload, and transmit the reply message to the requesting computer 102.

The front-end server 106 may be configured to execute software code containing instructions for generating request payloads from request messages and for generating reply messages from response payloads. In some embodiments, generating a request payload from a request message may involve mapping one or more request message fields to one or more request payload fields, and generating a reply message from a response payload may involve mapping one or more response payload fields to one or more reply message fields. Because the front-end server 106 may be operating in a production environment, the particular version of the software code executing on the front-end server 106 may be a production version of the software code. It should be noted that because errors in request payloads and/or reply messages may give rise to disruptions that could significantly affect the performance of the system 100, the production version of the software code may be thoroughly tested so as to minimize errors in the request payloads and the reply messages generated by the front-end server 106. Accordingly, configuring the front-end server 106 to execute any version of the software code other than a production version may be ill-advised.

The front-end server 106 may be communicatively coupled to the validation server 108. The validation server 108 may also be configured to execute a non-production version of the software code executed by the front-end server 106. For example, the validation server 108 may execute a modified version of the software code, the modified version being newer than the production version and having new features or characteristics that are not present in the production version. It should be noted that the features of the modified version may not have been thoroughly tested, and thus it may be ill-advised to execute the modified version on the front-end server 106.

To test the modified version of the software code, production environment data encountered by the front-end server 106 may be routed to the validation server 108. In particular, after receiving the response payload or after generating a reply message from a corresponding response payload, the front-end server 106 may provide the reply message, the response payload, a corresponding request payload, and a corresponding request message to the validation server 108 over the communicative coupling. With the modified version of the software code, the validation server 108 may generate a modified request payload from the provided request message and a modified reply message from the provided response payload. The validation server 108 may also be configured to compare the modified request payload to the request payload provided by the front-end server 106 to identify discrepancies between the modified request payload and the request payload. The validation server 108 may also be configured to compare the modified reply message to the reply message provided by the front-end server 106 in an attempt to identify discrepancies between the modified reply message and the reply message. In another embodiment, the validation server 108 may provide the modified reply message to the front-end server 106, and the front-end server may compare the reply message to the modified reply message. Any discrepancies that are identified may correspond to potential errors in the modified version of the software code and may be used by developers to investigate the potential errors.

Although FIG. 1 depicts the front-end server 106 and the validation server 108 as separate physical components, this is not intended to be limiting. In embodiments where the front-end server 106 and the validation server 108 are implemented using separate machines (e.g., separate computing devices, separate server clusters), the front-end server 106 and the validation server 108 may be communicatively coupled via a communication network (e.g., a LAN, a WLAN, a VPN). In some alternative embodiments, the front-end server 106 and the validation server 108 may execute on the same machine(s) (e.g., the same computing device, the same server cluster). For example, the front-end server 106 and the validation server 108 may be implemented in separate virtual machines or containers that execute on the same physical hardware. Regardless of how the front-end server 106 and the validation server 108 are physically implemented, communications between the servers 106 and 108 may network-based communications (e.g., Hypertext Transfer Protocol (HTTP), HTTP over Secure Socket Layer (SSL)). For example, the validation server 108 may provide a Representational State Transfer (REST) application programming interface (API) service that the front-end server 108 may invoke to provide production environment data.

The components of the front-end server 106 and the validation server 108, according to some embodiments, are discussed in further detail below with reference to FIG. 2 and FIG. 3 respectively.

The validation server 108 may be communicatively coupled to the logging service 112, which may be provided by a logging server. The logging service 112 may be configured to accept log entries from one or more clients including the validation server 108. Accordingly, when the validation server 108 identifies one or more discrepancies that may correspond to potential errors in a modified version of software code executed by the validation server, the validation server 108 may transmit a log entry to the logging service 112. Upon receiving a log entry, the logging service 112 may persist the log entry in a log (e.g., in a file or a database) and/or trigger one or more notifications to associated personnel. In some embodiments, aside from the communicative coupling to the front-end server 106, the validation server 108 is not exposed or communicatively coupled to the production environment or to any external entities (e.g., the requesting computers 102-104, the processor server 110). The isolation of the validation server 108 may reduce the risk of potential errors in the modified version of the software code affecting the production environment or the external entities.

The processor server 110 may be communicatively coupled to the front-end server 106 over the communication network 122 and to the resource computer and the authorization server. The processor server 110 may be configured to receive request payloads having one or more request payload fields from one or more front-end servers (e.g., gateway servers) including the front-end server 106. The processor server 110 may apply various transformations and other processing logic to the received request payloads before forwarding the request in some form to their intended recipient(s) (e.g., the resource computer, the authorization server). In embodiments where the processor server 110 corresponds to an authorization server or a resource computer, the processor server 110 may also be the intended recipient. In response to forwarding the request, the processor server 110 may receive a response, generate a response payload from the response and transmit the response payload to the intended front-end server (e.g., the front-end server 106). In some embodiments, the front-end server 106 may transmit request payloads and receive response payloads from the processor server 110 via HTTP/HTTPS calls. Each processor server, including processor server 110, may be associated with a processor identifier that can be used to uniquely identify the processor server or an organization associated with the processor server.

In some cases, a request message may embody a request to access a resource. For example, the resource may be a physical building, a computer, a computer account or file, or a payment account.

Access to the resource may be granted or denied by a resource computer that controls the resource or an authorization server that is in communication with the resource computer. For example, where the resource is access to a building, the resource computer may be integrated into the building or a door of the building, and the resource computer may grant a requester (i.e., an actor) access to the resource by unlocking the door. In this example, the resource computer may communicate to an authorization server that determines whether to grant access, and the resource computer can provide access based on a response from the authorization server. Processor server 110 can correspond to the resource computer or to the authorization server.

In another example, the resource is a computer account or file, where the resource computer comprises the computer account or file (i.e., the resource), and the resource computer may grant access to the requester. The resource computer may grant access to a requesting computer based on the determination of an authorization server. For example, to access a resource, a requesting computer may transmit a request message that includes authorization information.

II. Front-End Server

Figure 2:
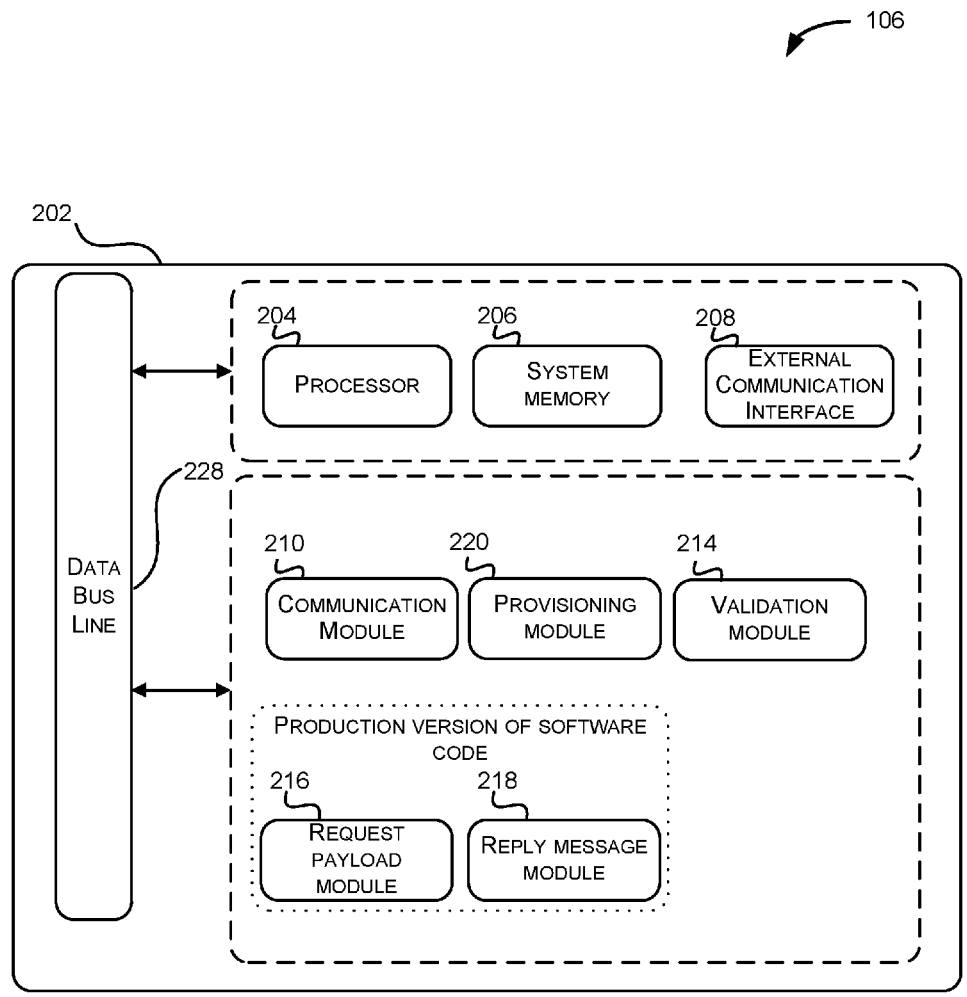
FIG. 2 illustrates a block diagram of an exemplary front-end computing system in accordance with embodiments.

FIG. 2 illustrates a block diagram of the front-end server 106 including an exemplary server computer 202 in accordance with embodiments. The server computer 202 is illustrated as comprising a plurality of hardware and software modules (204-228). However, it should be appreciated that this is provided for illustration purposes only, and each of the modules and associated functionality may be provided and/or performed by the same or different components. That is, the server computer 202 may perform some of the relevant functions and steps described herein with reference to the front-end server 106 through the use of any suitable combination of software instructions and/or hardware configurations. It should be noted that although FIG. 2 (and other system described herein) illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s). In some cases, the software modules may be located on a virtual machine or a container.

The server computer 202 is shown as comprising a processor 204, system memory 206 (which may comprise any combination of volatile and/or non-volatile memory such as, for example, buffer memory, RAM, DRAM, ROM, flash, or any other suitable memory device), and an external communication interface 208. Moreover, one or more of the modules 210-220 may be disposed within one or more of the components of the system memory 206, or may be disposed externally. As was noted above, the software and hardware modules shown in FIG. 2 (and other systems described herein) are provided for illustration purposes only, and the configurations are not intended to be limiting. The processor 204, system memory 206 and/or external communication interface 208 may be used in conjunction with any of the modules described below to provide a desired functionality. Some exemplary modules and related functionality may be as follows:

A communication module 210 may be configured or programmed to perform some or all of the functionality associated with receiving, sending, and generating electronic messages for transmission through the front-end server 106 to or from any of the entities shown in FIG. 2. When an electronic message is received by the server computer 202 via the external communication interface 208, it may be passed to the communication module 210. The communication module 210 may identify and parse the relevant data based on a particular messaging protocol used in the front-end server 106. As examples, the received information may comprise identification information, authorization information, request information, response information, and/or any other information that the front-end server 106 may utilize in processing a request message or a response payload. The communication module 210 may then transmit any received information to an appropriate module within the server computer 202 (e.g., via a data bus line 228). The communication module 210 may also receive information from one or more of the modules in the server computer 202 and generate an electronic message in an appropriate data format in conformance with a transmission protocol used in the front-end server 106 so that the message may be sent to one or more entities within system 100 (e.g., to one of the requesting computers 102-104, the processor server 110, the validation server 108). The electronic message may then be passed to the external communication interface 208 for transmission. The electronic message may, for example, comprise a request payload (e.g., to be transmitted to the processor server 110 via the communication network 122), a reply message (e.g., to be transmitted to a requesting computer), or any other suitable electronic message used in the context of a request for resources.

As previously described, front-end server 106 may be configured to execute a production version of software code that comprises instructions for (1) generating request payloads from request messages and (2) generating reply messages from response payloads. The production version may include a request payload module 216 and a reply message module 218.

The request payload module 216 may be programmed and/or configured to perform functionality associated with generating request payloads from received request messages. For example, the request payload module 216 may generate a request payload from a request message by mapping one or more request message fields of the request message to one or more request payload fields of the request payload that is being generated. Being production code, the code contained within the request payload module 216 may be thoroughly tested. This may reduce the chance of the request payload module 216 failing to produce a request payload from a request message (e.g., by causing the front-end server 106 to crash) or producing a malformed request payload (e.g., having missing request payload fields, unrecognized request payload fields, or incorrect values assigned to the request payload fields) that does not adhere to the message format expected by the processor server to which the request payload is to be sent. Upon generating a request payload, the request payload module 216 may store the request message and the request payload in the system memory 206 so that the request message and the request payload may be provided as production environment data to the validation server 108. The request payload module 216, with the involvement of the communication module 210, may transmit the request payload to the processor server.

The reply message module 218 may be programmed and/or configured to perform functionality associated with generating reply messages from received response payloads. For example, the reply message module 218 may generate a reply message from a response payload by mapping one or more response message fields of the response payload to one or more reply message fields of the reply message that is being generated. Being production code, the code contained within the reply message module 218 may be thoroughly tested. This may reduce the chance of the reply message module 218 failing to produce a reply message from a response payload or producing a malformed reply message that does not adhere to the message form expected by the requesting computer server to which the reply message is to be sent. Upon generating a reply message, the reply message module 218 may store the reply message and the response payload in the system memory 206 so that the reply message and the response payload may be provided as production environment data to the validation server 108. The reply message module 218, with the involvement of the communication module 210, may transmit the reply message to the requesting computer server.

In embodiments where the front-end server 106 compares a reply message and a modified reply message that is provided by the validation server 108, a validation module 214 may be programmed and/or configured to perform functionality associated with comparing messages generated by different versions of the same software code to identify discrepancies between messages that may correspond to potential errors in one of the different versions. In such embodiments, upon the reply message module 218 generating a reply message and the validation server 108 generating and providing a modified reply message, the validation module 214 may compare the modified reply message to the reply message. It should be noted that the validation module 214 may perform similar functions to the validation module 318 described below with respect to FIG. 3.

A provisioning module 220 may be programmed and/or configured to perform functionality associated with providing production environment data to the validation server 108. For the purposes of clarity, a combination of messages and payloads transmitted and/or generated on behalf of a single resource request (e.g., a combination of the request message, the request payload, the response payload, and optionally, the reply message for a single resource request) is herein referred to as a message set. For a resource request for access to a resource, after a (1) a request message for the resource request has been received, (2) a request payload has been generated from the request message, (3) a response payload has been received in response to the transmission of the request payload, and (4) a reply message has been generated from the response payload, provisioning module 220 (e.g., with the involvement of communication module 210) may obtain the message set from the system memory 206 and provide the message set to the validation server 108. In some embodiments, the provisioning module 220 may upload the message set to the validation server 108 via one or more asynchronous HTTP/HTTPS calls to a REST API provided by the validation server 108. In such embodiments, the provisioning module 220 may serialize the message set into a markup language (e.g., XML, JSON) and transmit the serialized message set to the validation server 108 via the one or more REST calls.

In some embodiments, the provisioning module 220 may be configured to provide only a portion of the production environment data encountered by the front-end server 106 to the validation server 108. In some embodiments, the provisioning module 220 may be configured to throttle the volume of production environment data provided to the validation server 108 based on a percentage. For example, the provisioning module 220 may be configured to provide, to the validation server 108, only 10% of the message sets encountered by the front-end server 106. In other words, any message set has only a 1 in 10 chance of being provided to the validation server 108.

In some embodiments, the provisioning module 220 may be configured to only provide production environment data that is associated with a particular requesting computer or a particular processor server. In some embodiments, a message set may specify (1) a requester identifier that uniquely identifies the requesting computer that sent the request message of the message set and (2) a processor identifier that uniquely identifies the processor server that received the request payload of the message set and sent the response payload of the message set. In such embodiments, the provisioning module 220 may use the identifiers specified in each message set to determine whether to provide the message set to the validation server 108. For example, if the provisioning module 220 is configured to provide only resource requests that originated from four different requesting computers for validation, the provisioning module 220 may inspect the requester identifier of each message set. If the requester identifier specified by a particular message set matches one of the identifiers of the four requesting computers, the provisioning module 220 may provide the message set to the validation server 108.

In some embodiments, the provisioning module 220 may be configured to determine (i.e., filter out) which message sets are provided based on the contents of the message sets. Different request messages may include different features. For example, if developers wish to test a particular feature that is new or modified within the modified version of the software code, the developers may configure the provisioning module 220 to only provide message sets where the request message of the message set invokes that feature (e.g., only provide message sets where the request message is for a dynamic currency conversion request).

III. Validation Server

Figure 3:
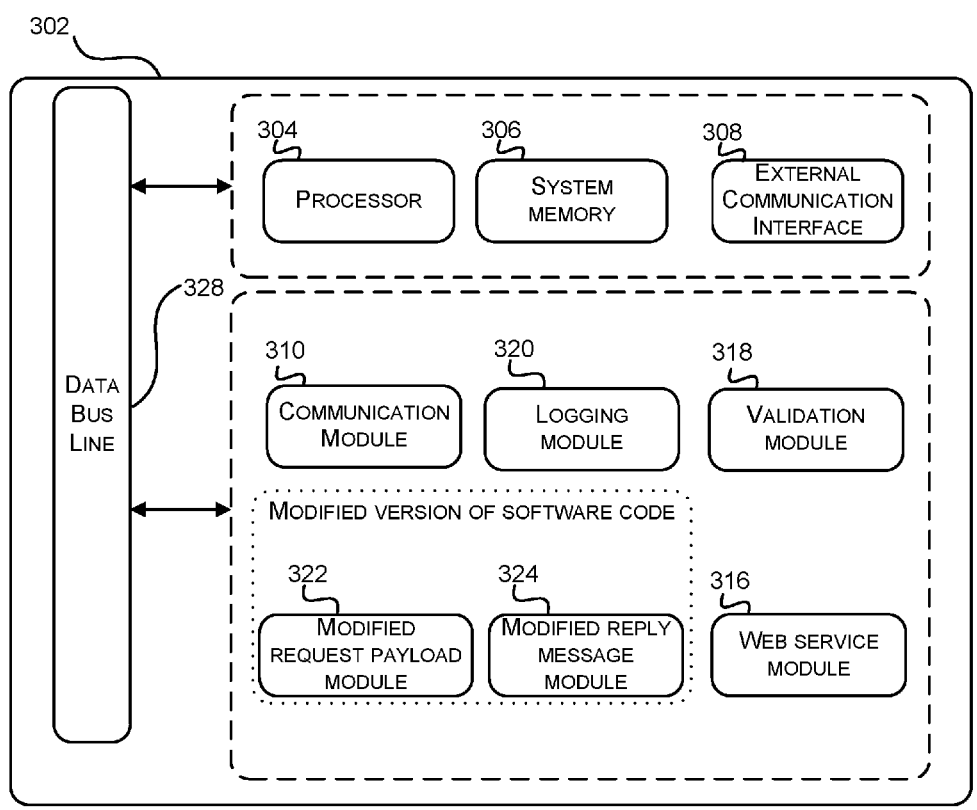
FIG. 3 illustrates a block diagram of an exemplary validation computing system in accordance with embodiments.

FIG. 3 illustrates a block diagram of the validation server 108 including an exemplary server computer 302 in accordance with embodiments. The server computer 302 is illustrated as comprising a plurality of hardware and software modules (304-328). However, it should be appreciated that this is provided for illustration purposes only, and each of the modules and associated functionality may be provided and/or performed by the same or different components. That is, the server computer 302 may, for instance, perform some of the relevant functions and steps described herein with reference to the validation server 108 through the use of any suitable combination of software instructions and/or hardware configurations.

The server computer 302 is shown as comprising a processor 304, system memory 306, and an external communication interface 308. Moreover, one or more of the modules 310-324 may be disposed within one or more of the components of the system memory 306, or may be disposed externally. The processor 304, system memory 306 and/or external communication interface 308 may be used in conjunction with any of the modules described below to provide a desired functionality. Some exemplary modules and related functionality may be as follows.

A communication module 310 may be configured or programmed to perform some or all of the functionality associated with receiving, sending, and generating electronic messages for transmission through the validation server 108 to or from any of the entities shown in FIG. 3. When an electronic message is received by the server computer 302 via the external communication interface 308, it may be passed to the communication module 310. The communication module 310 may identify and parse the relevant data based on a particular messaging protocol used in the validation server 108. As examples, the received information may comprise identification information, authorization information, request information, response information, and/or any other information that the validation server 108 may utilize in processing a request message or a response payload. The communication module 310 may then transmit any received information to an appropriate module within the server computer 302 (e.g., via a data bus line 328). The communication module 310 may also receive information from one or more of the modules in the server computer 302 and generate an electronic message in an appropriate data format in conformance with a transmission protocol used in the validation server 108 so that the message may be sent to one or more entities within system 100 (e.g., to the logging service 112). The electronic message may then be passed to the external communication interface 308 for transmission. The electronic message may, for example, comprise a log entry (e.g., to be transmitted to the logging service 112), a modified reply message (e.g., to be transmitted to the front-end server 106), or any other suitable electronic message used in the context of a request for resources.

A web service module 316 may be programmed and/or configured to perform functionality associated with providing a web-based interface having one or more functions that the front-end server 106 may invoke to provide message sets. In some embodiments, the web service module 316 may, with involvement from communication module 310, expose a REST API to the front-end server 106. After obtaining a message set, the front-end server 106 may make one or more asynchronous HTTP/HTTPS calls to the REST API to upload the message set to the validation server 108.

As previously described, validation server 108 may be configured to execute a modified version of software code that comprises instructions for (1) generating modified request payloads from request messages and (2) generating modified reply messages from response payloads. The production version may include a modified request payload module 322 and a modified reply message module 324, which correspond to request payload module 216 and reply message module 218.

The modified request payload module 322 may be programmed and/or configured to perform functionality associated with generating modified request payloads from request messages provided by the front-end server 106. For example, the modified request payload module 322 may generate a modified request payload from a request message by mapping one or more request message fields of the request message to one or more modified request payload fields of the modified request payload that is being generated. It should be noted that the code contained within the modified request payload module may include modified code implementing new features that are not provided by the request payload module 216. Because of these new features, the modified request payload may have one or more differences (e.g., new fields, missing fields, different values assigned to fields) from the request payload generated by the front-end server 106. Upon generating the modified request payload, the modified request payload module 322 may store the modified request payload in the system memory 306 so that the request payload and the modified request payload may be accessed by the validation module 318.

The modified reply message module 324 may be programmed and/or configured to perform functionality associated with generating modified reply messages from response payloads provided by the front-end server 106. For example, the modified reply message module 324 may generate a modified reply message from a response payload by mapping one or more response payload fields of the response payload to one or more modified reply message fields of the modified reply message that is being generated. It should be noted that the code contained within the modified reply message module may include modified code implementing new features that are not provided by the reply message module 218. Because of these new features, the modified reply message may have one or more differences from the reply message generated by the front-end server 106. Upon generating the modified reply message, the modified reply message module 324 may store the modified reply message in the system memory 306 so that the reply message and the modified reply message may be accessed by the validation module 318.

A validation module 318 may be programmed and/or configured to perform functionality associated with comparing messages generated by different versions of the same software code to identify discrepancies between the messages that may correspond to potential errors in one of the different versions. Upon the modified request payload module 322 generating a modified request payload from a request message, the validation module 318 may compare the modified request payload to the request payload generated from the same request message by the front-end server 106. Upon the modified reply message module 324 generating a modified reply message from a response payload, the validation module 318 may compare the modified reply message to the reply message generated from the same response payload by the front-end server 106. As mentioned previously, in other embodiments, part of validation module 318 may be on front-end server 106, e.g., for comparing the modified reply message with the reply message after front-end server 106 receives the modified reply message from validation server 108.

In either comparison, the validation module 318 may use regular expression operations (e.g., a regex function) to compare values assigned to the fields of one message against values assigned to the same fields in the other message. For example, when comparing a modified request payload to a request payload, the validation module 318 may compare an account number specified by the modified request payload to the account number specified by the request payload. Here, anything other than an exact match between the account numbers may identify a discrepancy between the modified request payload and the request payload.

It should be noted, however, that due to the new features incorporated into the modified version of the software code, certain differences between messages and their modified counterparts may be expected. For example, the modified version of the software code may include new features that cause modified request payloads to include several new fields that do not violate the message format expected by processor servers. Moreover, certain dynamic fields such as timestamp fields and random number fields are expected to vary between each message. Accordingly, the validation module 318 may be configured to ignore and/or mask out these differences and other differences that would not correspond to potential errors in the modified version of the software code.

However, remaining differences that are detected by the regular expression operations may correspond to potential errors in the modified version of the software code. Each time a discrepancy is identified between a message and its modified counterpart, the validation module 318 may cause a log entry to be logged. The log entry may comprise information that would assist developers in investigating how the discrepancy between the messages arose. For example, the resulting log entry may include the requester identifier associated with the messages, the processor identifier associated with the messages, one or more fields with values that do not match, one or more unrecognized fields, one or more missing fields, and/or an identifier associated with the associated request message.

In some embodiments, the validation module 318 may be configured to perform other checks on the modified request payload and the modified reply message generated by the modified version of the software code to ensure correctness and compatibility with message formats expected by external entities. Exemplary validation operations may include ensuring that certain fields in a modified message are present, ensuring that certain fields are of the correct type (e.g., ensuring that a string field is assigned a string), and ensuring that certain values are of the correct length (e.g., ensuring that an account number has an expected number of digits).

A logging module 320 may be programmed and/or configured to perform functionality associated with generating and transmitting log entries to a logging service. In particular, each time the validation module 318 identifies a discrepancy between messages, the logging module 320 may receive information about the discrepancy from the validation module 318 and generate a log entry that encapsulates the information. The logging module 320 may transmit the log entry to a logging service (e.g., logging service 112). In some embodiments, the logging module 320 may forward the log entry to a graphical monitoring system (e.g., Graphana) so that the log entry or an alert based on the log entry can be sent or displayed to relevant personnel. In some embodiments, a monitoring system may monitor the log and display graphical information pertaining to the discrepancies.

IV. Testing Software Code in Production Environment

Figure 4:
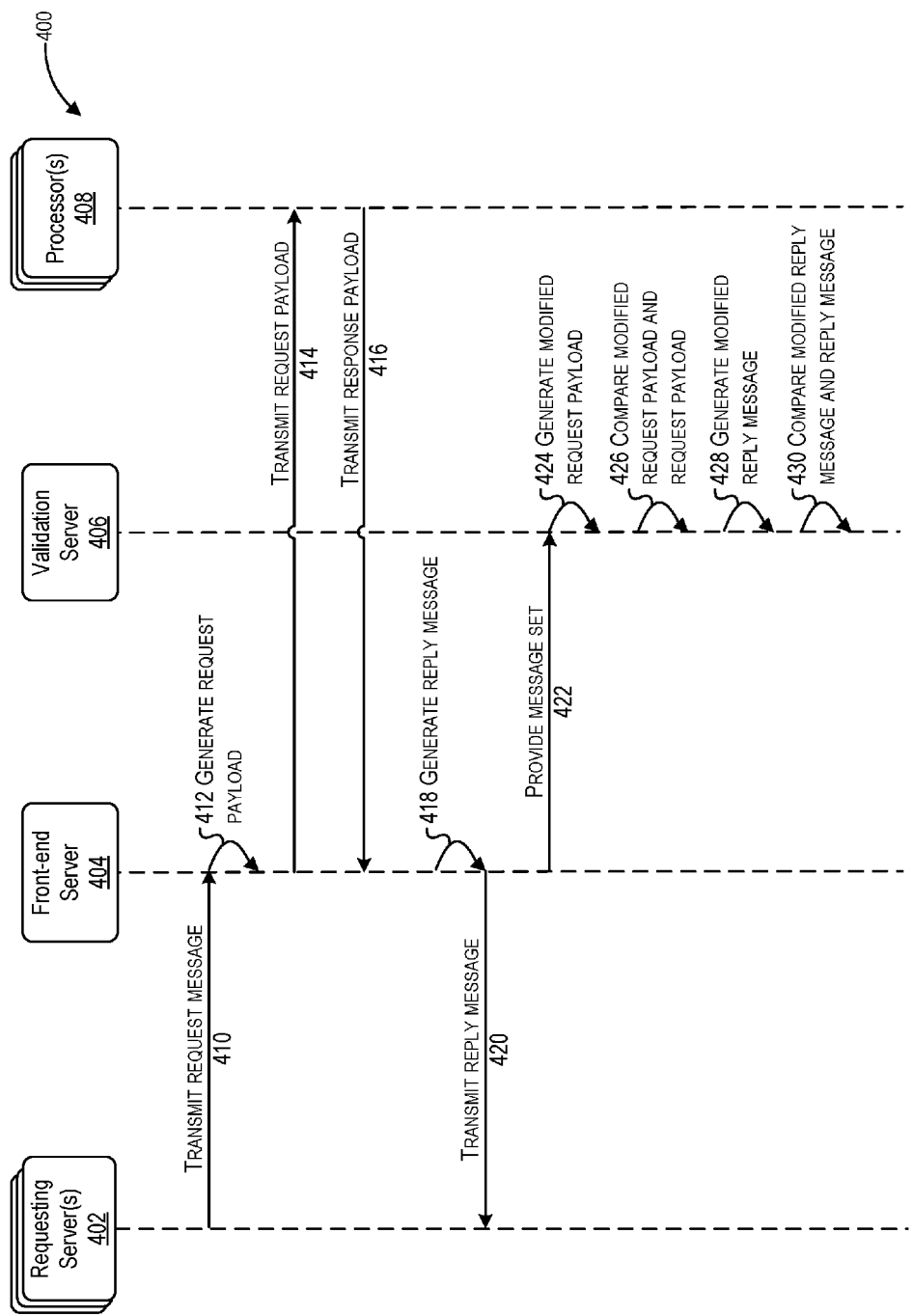
FIG. 4 illustrates a sequence diagram showing operations for testing software code in a production environment in accordance with embodiments.

FIG. 4 illustrates a sequence diagram showing operations for testing software code in a production environment in accordance with embodiments. As depicted in FIG. 4, system 400 includes the requesting server(s) 402, the front-end server 404, the validation server 406, and the processor(s) 408. Note that the requesting server(s) 402, the front-end server 404, the validation server 406, and the processor(s) 408 may be analogous to the requesting computer 102, the front-end server 106, the validation server 108, and the processor server 110 respectively.

At step 410, the requesting server 402 generates and transmits a request message to the front-end server 404. The request message can indicate a request to an authorization server to access a resource managed by a resource computer. For example, the resource may be a physical building, a computer, a computer account or file, or a payment account. Access to the resource may be granted or denied by the resource computer or an authorization server that is in communication with the resource computer.

At step 412, the front-end server 404 generates a request payload from the request message received from the requesting server 402. The request payload can have the same or similar data content as the request message but in a message format that is compatible with the processor server 408. The front-end server 404 may additionally store the request message in memory for later provisioning to the validation server 406

At step 414, the front-end server 404 transmits the request payload to the processor server 408. The front-end server 404 may additionally store the request payload in memory for later provision to the validation server 406. In some embodiments, the processor server 408 may forward the request payload to an authorization server or the resource computer.

At step 416, the processor server 408 transmits a response payload to front-end server 404. The response payload can indicate whether the request to access the resource is granted or denied. In some embodiments, the authorization server may generate the response payload in response to the transmission of the request payload in step 414. In some embodiments, the response payload may refer to the request payload via one or more fields contained in the request payload that uniquely identify the request payload (e.g., a request identifier).

At step 418, the front-end server 404 generates a reply message from the response payload received from the processor server 408. The reply message can have the same indication as the response payload but in a message format that is compatible with the requesting server 402. The front-end server 404 may additionally store the response payload in memory for later provision to the validation server 406.

At step 420, the front-end server 404 transmits the reply message to the requesting server 402. In some embodiments, if the reply message indicates that the request is granted, the requesting server 402 may proceed to communicate with the resource computer to access the requested resource.

At step 422, the front-end server 404 provides the message set (e.g., the request message transmitted in step 410, the request payload generated in step 412, the response payload transmitted in step 416, and, in embodiments where the validation server performs the comparison of the reply message and the modified reply message, the reply message generated at step 418) to the validation server 406. In some embodiments, the front-end server 404 may provide the message set by making one or more asynchronous HTTP/HTTPS calls to a REST API provided by the validation server 406.

At step 424, the validation server 406 generates a modified request payload from the request message provided in step 422. The modified request payload can be generated using the modified request payload module 322.

At step 426, the validation server 406 compares the request payload provided in step 422 to the modified request payload generated in step 424 to identify discrepancies between the payloads that may correspond to potential errors in the modified version of the software code. The process of validation can occur as is described herein.

At step 428, the validation server 406 generates a modified reply message from the response payload provided in step 422. The modified reply message can be generated using the modified reply message module 324.

At step 430, the validation server 406 compares the reply message provided in step 422 to the modified reply message generated in step 428 to identify discrepancies between the payloads that may correspond to potential errors in the modified version of the software code. It should be noted that while the comparisons performed in steps 426 and 430 may be performed within a short time (e.g. on the order of milliseconds) after the reply message is generated in step 424.

It should be noted that in embodiments where the validation server performs the comparison of the reply message and the modified reply message, after step 428, the validation server 406 may provide the modified reply message to the front-end server 404. In particular, the provision of the modified reply message to the front-end server 404 may be accomplished similarly to how the front-end server 404 provides the message set to the validation server 406 (e.g., by uploading the modified reply message to the front-end server via one or more asynchronous HTTP/HTTPS calls to another REST API that is provided by the front-end server). After receiving the modified reply message, the front-end server 404 may compare the reply message to the modified reply message in much the same way as described in step 430.

Afterwards, if any discrepancies are identified, validation server 406 may cause one or more log entries describing the discrepancies to be sent to a logging service. In response, the log entries may cause developers to determine whether the discrepancies are caused by errors within the modified version of the software code. If so, the developers may then proceed to fix the errors within the modified version of the software code. In some embodiments, in response to identifying one or more discrepancies, an automated alert mechanism may be configured to alert developers of the modified version of the software code of the one or more discrepancies.

When no discrepancies are detected for an agreed amount of time, the modified version of the software code may be deemed fully validated under production conditions. Afterwards, the production version of the software code on the front-end server may be replaced with the modified version of the software code.

Figure 5:
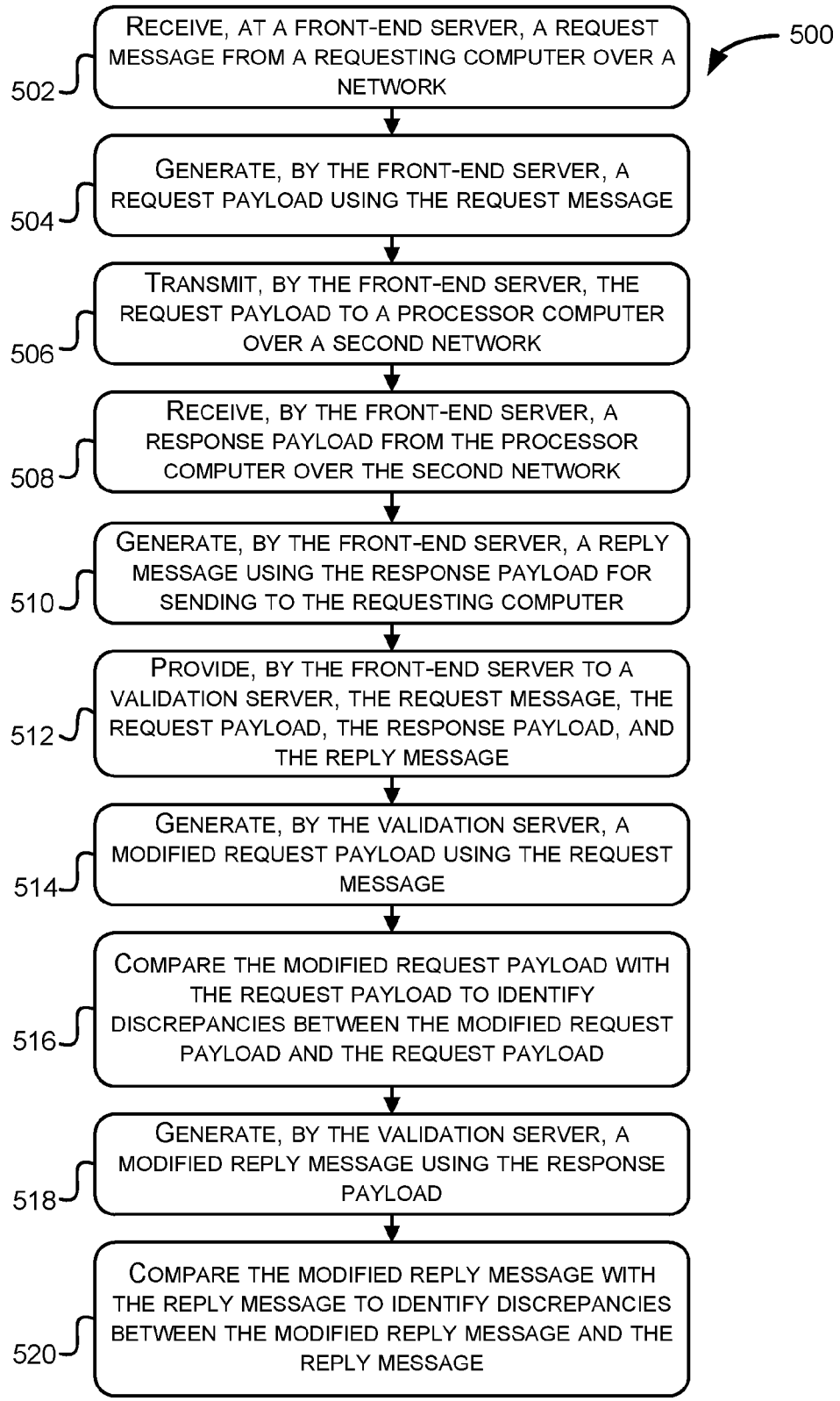
FIG. 5 shows a flowchart illustrating an exemplary method of testing software code in a production environment in accordance with embodiments.

FIG. 5 shows a flowchart illustrating an exemplary method 500 of testing software code in a production environment in accordance with embodiments.

At step 502, a front-end server receives a request message from a requesting computer over a network, where the front-end server executes a production version of the software code. The front-end server may include a front-end computing device, where the front-end computing device corresponds to hardware and/or software that implements the front-end server. For example, the front-end computing device may correspond to the server computer 202. The request message can be for various purposes and take various forms. For example, the request message can indicate a request to an authorization server to access a resource managed by a resource server. In this example, the resource may be a physical building, a computer, a computer account or file, or a payment account. Access to the resource may be granted or denied by the resource computer or an authorization server that is in communication with the resource computer. The requesting computer may correspond to a hardware and/or software that is configured to send one or more request messages. For example, the requesting computer may correspond to the requesting computer 102

At step 504, the front-end server generates a request payload using the request message, wherein the request payload has a plurality of request-payload fields. For example, the request payload module 216 can generate the request payload by mapping one or more fields within the request message to one or more request-payload fields in the request payload. The resulting request payload may follow a particular message format that is compatible with the intended recipient or one or more intermediaries between the intended recipient and the front-end server (e.g., a processor server).

At step 506, the front-end server transmits the request payload to a processor computer over a second network. The processor computer may correspond to hardware and/or software that implements a processor server (e.g., the processor server 110), where the processor server is configured to receive request payloads having one or more request payload fields from one or more front-end servers. In some embodiments, the processor server may correspond to the resource server or the authorization server.

At step 508, the front-end server receives a response payload from the processor computer over the second network. The resource payload may include a response to the request message sent by the requesting computer, where the response indicates a granting or a denial of the request included in the request message. In embodiments where the processor server corresponds to the resource server or the authorization server, the response payload may be generated by the processor server. In embodiments where the processor server serves as an intermediary between the front-end server and the resource server or the authorization server, the processor server may apply one or more transformations to the response generated by the resource server or the authorization server and forward the response to the front-end server as the response payload.

At step 510, the front-end server generates a reply message using the response payload for sending to the requesting computer, where the reply message has a plurality of reply-message fields. For example, the reply module 218 can generate the reply message by mapping one or more fields of the response payload to one or more reply-message fields within the reply message. The resulting reply message may follow a particular message format that is compatible with the requesting computer.

At step 512, the front-end server provides the request message, the request payload, the response payload, and, in some embodiments, the reply message to a validation server that is executing in coordination with the front-end computing server. The validation server executes a modified version of the software code. The validation server may include a validation computing device, where the validation computing device corresponds to hardware and/software that implements the validation server.

At step 514, the validation server generates a modified request payload using the request message, where the modified request payload has a plurality of modified request-payload fields. For example, the modified request payload module 322 within the validation server 108 may generate the modified request payload by mapping the one or more fields of the request message to the plurality of modified request-payload fields. In some cases, the resulting modified request payload may follow the particular message format that is compatible with the intended recipient or one or more intermediaries between the intended recipient and the front-end server (e.g., a processor server) if there are no errors within the modified version of the software code that would cause the generation of a modified request payload that does not follow the particular message format.

At step 516, the modified request payload is compared with the request payload to identify discrepancies between the modified request payload and the request payload, where the identified discrepancies correspond to potential errors in the modified version of the software code. For example, the validation module 318 within the validation server 108 may compare the modified request payload with the request payload. In another embodiment, the validation module 214 within the front-end server 106 may perform the comparison after the validation server provides the modified request payload to the front-end server.

At step 518, the validation server generates a modified reply message using the response payload, where the modified reply message has a plurality of modified reply-message fields. For example, the modified reply message module 324 within the validation server 108 may generate that modified reply message by mapping the one or more fields of the response payload to the plurality of modified reply-message fields. In some cases, the resulting modified reply message may follow the particular message format that is compatible with the requesting computer if there are no errors within the modified version of the software code that would cause the generation of a modified request payload that does not follow the particular message format.

At step 520, the validation server compares the modified reply message with the reply message to identify discrepancies between the modified reply message and the reply message, where the identified discrepancies correspond to potential errors in the modified version of the software code. For example, the validation module 318 within the validation server 108 may compare the modified reply message with the reply message. In another embodiment, the validation module 214 within the front-end server 106 may perform the comparison after the validation server provides the modified reply message to the front-end server.

V. Request Message Processing Flow

Figure 6:
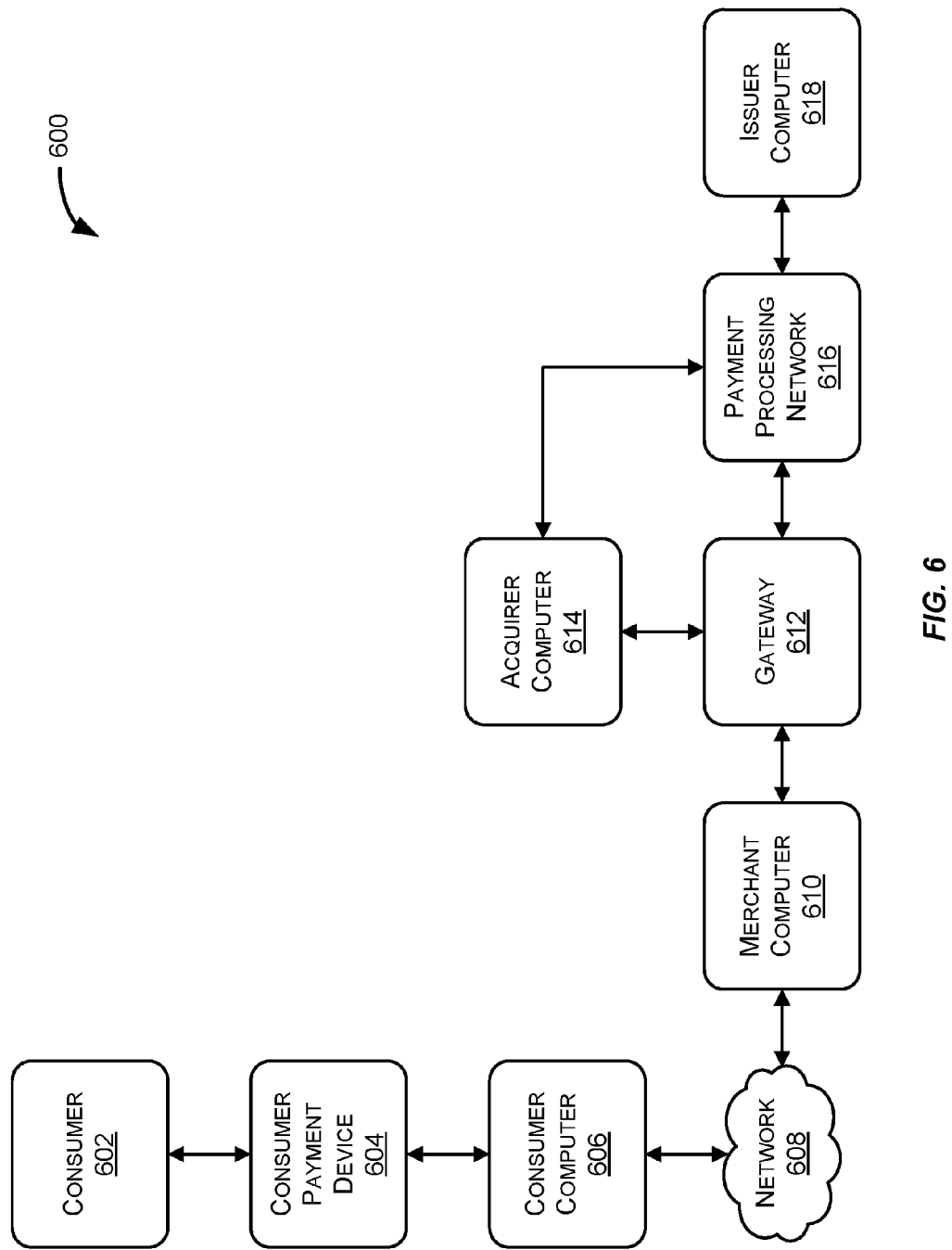
FIG. 6 illustrates a block diagram of an exemplary payment processing system in accordance with embodiments.

FIG. 6 illustrates a block diagram of an exemplary payment processing system 600 in accordance with some embodiments. Although some of the entities and components in the system 600 are depicted as separate, in some instances, one or more of the components may be combined into a single device or location. Similarly, although certain functionality may be described as being performed by a single entity or component within the system 600, the functionality may in some instances be performed by multiple components and/or entities. Communication between entities and components may comprise the exchange of data or information using electronic messages and any suitable electronic communication medium and method, as described below.

As illustrated in FIG. 6, the system 600 may include one or more consumers, consumer payment devices, consumer computers, networks, merchant computers, gateways, acquirer computers, payment processing networks, issuers computer, and/or any other suitable payment processing entities. For instance, as illustrated in FIG. 6, the system 600 can include a consumer 602 having a consumer payment device 604. The consumer 602 can be an individual, an organization such as a business, or any other suitable entity capable of purchasing goods and/or services using the consumer payment device 604.

The consumer payment device 604 can be in any suitable form. For instance, a suitable payment device can be handheld and compact so that it can fit into a wallet and/or pocket (e.g., pocket-sized) of the consumer 602. Exemplary consumer payment devices may include, but are not limited to, smart cards, magnetic stripe cards, keychain devices (such as the Speedpass™ commercially available from Exxon-Mobil Corp.), smart media, transponders, 2-D barcodes, QR codes, and the like. If the consumer payment device 604 is in the form of a smartcard or other payment card (e.g., a debit card, credit card, prepaid card, gift card, and the like), the consumer payment device 604 may operate in a contact mode (e.g., using data stored on a magnetic stripe) and/or a contactless mode (e.g., using contactless circuitry and wireless communication such as NFC, Bluetooth, and the like).

The system 600 can further include a consumer computer 606 that may include an external communication interface (e.g., for communicating with a merchant computer 608 or other entity), system memory comprising one or more modules to generate and utilize electronic messages, and a data processor for facilitating a financial transaction conducted with a merchant operating the merchant computer 608. The consumer computer 606 can be any suitable computing device, including a stationary device (e.g., a desktop computer) or a mobile device such as a laptop computer, tablet computer, net book, mobile phone (e.g., a smartphone), and the like.

In some embodiments, the system 600 can further include the merchant computer 608 which may be operated by a merchant. As used herein, a "merchant" may refer to an entity that engages in transactions and that can sell goods and/or services to consumers. The merchant computer 608 can include an external communication interface (e.g., for communicating with the consumer computer 606, a gateway 612, or other entity), system memory comprising one or more modules to generate and utilize electronic messages, and a data processor for facilitating financial transactions and the exchange of electronic messages. In some embodiments, the merchant computer 608 may be analogous to the requesting computer 102.

To conduct a purchase transaction, in some embodiments, the consumer 602 can use the consumer computer 606 to communicate with the merchant computer 608. Such a transaction may involve the consumer 602 using the consumer computer 606 to provide account information associated with the consumer payment device 604 to the merchant computer 608. For instance, the merchant computer 608 may host a merchant website that provides an interface for the consumer 602 to select goods and/or services for purchase and enter account information to pay for the purchase such as an account number, expiration date, CVV, and the like.

In some embodiments, the consumer computer 606 and the merchant computer 610 can communicate using a communication network 608 which may be any suitable communication network such as the Internet, a voice network, and/or a data network. As noted above, any suitable communication protocol can be used including, but not limited to, WiFi (IEEE 802.11 family standards), 3G, 4G EDGE, and the like.

The system 600 may further include an acquirer computer 614 operated by an acquirer. As used herein, an "acquirer" may refer to a business entity (e.g., a commercial bank or financial institution) that has a business relationship with a particular merchant or similar entity, and that facilitates clearing, settlement, and any other suitable aspect of electronic payment transactions. The acquirer computer 614 may include an external communication interface (e.g., for communicating with the merchant computer 608, the gateway 612, a payment processing network 616, or other entity), system memory comprising one or more modules to generate and utilize electronic messages, and a data processor for facilitating financial transactions and the exchange of electronic messages. In some embodiments, the acquirer computer 614 may be analogous to the authorization server mentioned in reference to FIG. 1.

The system 600 may further include an issuer computer 618 operated by an issuer. As used herein, an "issuer" may refer to a business entity (e.g., a bank or other financial institution) that maintains financial accounts for consumers and that may issue payment accounts and consumer payment devices (e.g., credit cards, debit cards, and the like) used to access funds of such accounts. Some entities may perform both issuer and acquirer functions. The issuer computer 618 may include an external communication interface (e.g., for communicating with the payment processing network 616 or other entity), system memory comprising one or more modules to generate and utilize electronic messages, and a data processor for facilitating financial transactions and the exchange of electronic messages. In some embodiments, the issuer computer 618 may be analogous to the resource computer mentioned in reference to FIG. 1.

The system 600 may further include the payment processing network 616, which may include data processing subsystems, networks, and operations used to support and deliver authorization services, exception file services, and clearing and settlement services. For instance, the payment processing network 616 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 616 may include an external communication interface (e.g., for communicating with the gateway 612, the acquirer computer 614, the issuer computer 618, or other entity), system memory comprising one or more modules to generate and utilize electronic messages, and a data processor for facilitating financial transactions and the exchange of electronic messages. In some embodiments, the server computer included in the payment processing network 616 may be analogous to the processor server 110.

As shown in FIG. 6, the system 600 can further include the gateway 612. As used herein, a "gateway" can be any entity that provides services in support of electronic payment transactions. In some embodiments, as described in further detail below, such services can include detecting merchant fraud using rules provided by acquirers and/or default rules. The gateway 612 may include an external communication interface (e.g., for communicating with the merchant computer 608, the acquirer computer 614, the payment processing network 616, the issuer computer 618, or other entity), system memory comprising one or more modules to generate and utilize electronic messages, and a data processor for facilitating financial transactions and the exchange of electronic messages. In some embodiments, the gateway 612 may be analogous to the production environment containing the front-end server 106 and the validation server 108 mentioned in FIG. 1.

The consumer computer 606, merchant computer 608, gateway 612, acquirer computer 614, payment processing network 616, and issuer computer 618 may all be in operative communication with each other. For instance, as described above, some or all of these components of the system 600 can include an external communication interface. As used herein, an "external communication interface" may refer to any hardware and/or software that enables data to be transferred between two or more components of the system 600 (e.g., between devices residing at locations such as an issuer, acquirer, merchant, or payment processing network, etc.). Some examples of external communication interfaces may include a modem, a network interface (such as an Ethernet card), a communications port, a Personal Computer Memory Card International Association (PCMCIA) slot and card, and the like. Data transferred via an external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

As would be understood by one of ordinary skill in the art, any suitable communications protocol for storing, representing, and transmitting data between components of the system 600 may be used. Some examples of such methods may include utilizing predefined and static fields (such as in core TCP/IP protocols); "Field: Value" pairs (e.g., HTTP, FTP, SMTP, POP3, and SIP); an XML based format; and/or Tag-Length-Value format.

As described above, the system 600 can facilitate an electronic commerce (e-commerce) transaction where, for instance, the consumer 602 purchases goods and/or services using a merchant website hosted by the merchant computer 608 and accessible via the network 608 using the consumer computer 606. In some other embodiments, the system 600 can also facilitate a "card present" transaction where the consumer 602 makes a purchase in-person at a merchant location (e.g., a store, restaurant, hotel, or any other suitable retail establishment). In such embodiments, the merchant computer 608 can include (or be coupled to) a merchant access device. Exemplary merchant access devices may include point of sale (POS) devices (stationary and mobile), mobile phones (e.g., smartphones), PDAs, desktop computers, laptop computers, tablet computers, handheld specialized readers, set-top boxes, electronic cash registers (ECRs), automated teller machines (ATMs), kiosks, and the like. A merchant access device can use any suitable contact or contactless mode of operation to send or receive date from, or associated with, consumer payment devices (e.g., the consumer payment device 604). In some embodiments, a merchant access device may include a reader including one or more of radio frequency (RF) antennas, optical scanners, bar code readers, QR code readers, and magnetic stripe readers to interact with a consumer payment device such as the consumer payment device 604.

In some embodiments, the consumer payment device 604 can be a mobile device such as a mobile phone (e.g., smart phone), tablet computer, PDA, net book, laptop computer, media player, or the like. A mobile device may facilitate an "electronic" or "digital wallet" that may be used to conduct an electronic payment transaction. In such embodiments, an electronic wallet server (not shown) may be in operational communication with the merchant computer 608, gateway 612, payment processing network 616, and/or other entity, and may maintain an association between the consumer's digital wallet and one or more payment accounts (e.g., credit, debit, prepaid accounts, and the like). An electronic wallet server can provide a web interface (e.g. through one or more web pages) to receive and transmit requests for payment services and/or may provide an application program interface (API) on the consumer payment device 604 to provide the web service. A digital wallet can be utilized in both e-commerce and card present transaction environments.

A description of a typical electronic transaction flow using the system 600 may be helpful in understanding embodiments of the invention. As an initial step, the consumer 602 can attempt to purchase goods and/or services from a merchant. In the context of an e-commerce transaction, this may involve the consumer 602 selecting the items to purchase from a website hosted by the merchant computer 608 accessible via the network 608 using the consumer computer 606. The consumer can enter payment information (e.g., an account number, expiration date, CVV, etc.) on the merchant website or, in some embodiments, a HOP or SOP hosted by the gateway 612. In some embodiments, the payment information can already be stored in a database (e.g., a "cards-on-file database) accessible to the merchant computer 608 (or gateway 612).

The merchant computer 608 can then generate an authorization request message for the transaction, and can transmit this message to the gateway 612. In some embodiments, the authorization request message may be analogous to the request messages transmitted by the requesting computers 102-104. The gateway 612 can then transmit the authorization request message to the payment processing network 616 which may forward the message to the issuer computer 618 operated by the issuer of the account associated with the consumer payment device 604. In some embodiments, the authorization request message transmitted by the gateway 612 to the payment processing network 616 may be in the form of a request payload.

Upon receipt of the authorization request message, the issuer computer 618 can perform a number of processes (e.g., verifying the account, confirming that the account has a sufficient balance or available credit to cover the amount of the transaction, consumer fraud detection, and/or other processes) to determine whether to authorize the transaction. An authorization response message is then generated by the issuer computer 618 including an indication of the authorization decision, and transmitted by the issuer computer 618 to the gateway 612 via the payment processing network 616. In some embodiments, the payment processing network 616 may forward the authorization response message to the gateway 612 in the form of a response payload. The gateway 612 stores a record of the authorization decision and then forwards the authorization response message to the merchant computer 608. In some embodiments, the gateway 612 may forward the authorization response message to merchant computer 608 in the form of a reply message. The merchant computer 608 may then provide an indication to the consumer 602 whether authorization of the transaction has been approved or declined by the issuer. In some embodiments, this may involve displaying an indication of the authorization decision on the consumer computer 606 connected to the merchant's website via the network 608.

At the end of the day, if the transaction was authorized by the issuer, a clearing and settlement process can be conducted by the gateway 612. A clearing process may include the exchange of financial details between the acquirer computer 614 and the issuer computer 618 across the payment processing network 616 to facilitate posting to the consumer's account and reconciliation of the settlement position. A settlement process may include the actual transfer of funds from the issuer computer 618 to the acquirer computer 614. In some embodiments, to initiate settlement, the gateway can transmit a settlement file including the an approval code for the transaction (along with other approved transactions in a batch format) to the payment processing network 616 which can then communicate with the issuer computer 618 and the acquirer computer 614 to facilitate the transfer of funds.

VI. Computer Apparatus

The various participants and elements described herein with reference to FIGS. 1-6 may operate one or more computer apparatuses to facilitate the functions described herein. Any of the elements in FIGS. 1-6, including any servers or databases, may use any suitable number of subsystems to facilitate the functions described herein.

Figure 7:
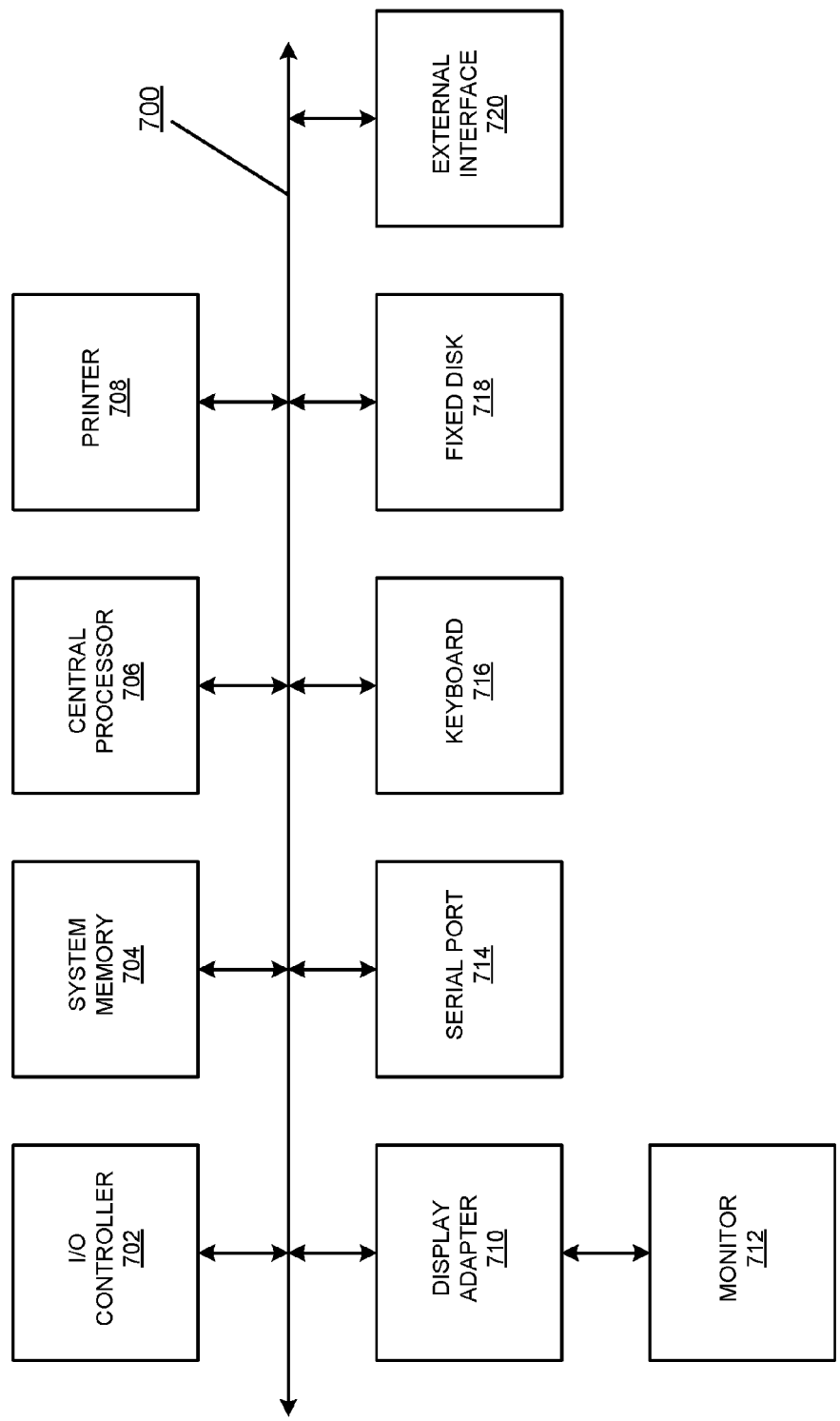
FIG. 7 illustrates a block diagram of an exemplary computer apparatus.

Examples of such subsystems or components are shown in FIG. 7 which illustrates exemplary computer apparatus 700. The subsystems shown in FIG. 7 are interconnected via a system bus 702. Additional subsystems such as a printer 710, keyboard 716, fixed disk 718 (or other memory comprising computer readable media), monitor 722, which is coupled to a display adapter 712, and others are shown. Peripherals and input/output (I/O) devices, which couple to I/O controller 704 (which can be a processor or other suitable controller), can be connected to the computer system by any number of means known in the art, such as a serial port 714. For instance, serial port 714 or an external interface 720 can be used to connect computer apparatus 700 to a wide area network such as the Internet, a mouse input device, or a scanner. The interconnection via system bus 702 allows a central processor 708 to communicate with each subsystem and to control the execution of instructions from a system memory 706 or fixed disk 718, as well as the exchange of information between subsystems. System memory 706 and/or fixed disk 718 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising performing, by a computer system:
    receiving, from a requesting server computer over a first network, a request message at a front-end computing device, the front-end computing device executing a first version of a software code;
    generating, by the front-end computing device, a request payload using the request message, the request payload having a plurality of request-payload fields;
    transmitting, by the front-end computing device, the request payload to a processor computer over a second network;
    receiving, by the front-end computing device, from the processor computer over the second network, a response payload;
    generating, by the front-end computing device, a reply message using the response payload for sending to the requesting server computer, the reply message having a plurality of reply-message fields;
    providing, by the front-end computing device to a validation computing device executing in coordination with the front-end computing device, the request message, the request payload, and the response payload, the validation computing device executing a second version of the software code;
    generating, by the validation computing device, a modified request payload using the request message, the modified request payload having a plurality of modified request-payload fields;
    comparing the plurality of modified request-payload fields of the modified request payload with the plurality of request-payload fields of the request payload to identify discrepancies between the modified request payload and the request payload corresponding to potential errors in the second version of the software code;
    generating, by the validation computing device, a modified reply message using the response payload, the modified reply message having a plurality of modified reply-message fields; and
    comparing the plurality of modified reply-message fields with the plurality of reply-message fields to identify discrepancies between the modified reply message and the reply message corresponding to potential errors in the second version of the software code.

2. The method of claim 1, further comprising:
    responsive to identifying less than a specified number of discrepancies in the second version of the software code, replacing the first version of the software code with the second version of the software code at the front-end computing device.

3. The method of claim 2:
    wherein the front-end computing device receives a plurality of request messages over a specified period of time, the plurality of request messages including the request message; and
    wherein identifying less than the specified number of discrepancies in the second version of the software code comprises identifying less than the specified number of discrepancies in the second version of the software code from the plurality of request messages received over the specified period of time.

4. The method of claim 1, further comprising:
    responsive to determining a discrepancy between the modified reply message and the reply message, generating a log entry or a notification.

5. The method of claim 1, wherein, prior to providing the request message, the request payload, and the response payload to the validation computing device, the method further comprises:
    transmitting, by the front-end computing device to the requesting server computer over the first network, the reply message.

6. The method of claim 1, wherein providing the request message, the request payload, and the response payload to the validation computing device comprises:
    invoking, via an asynchronous Hypertext Transfer Protocol (HTTP) call or an asynchronous HTTPS call, a representational state transfer (REST) function of a REST service provided by the validation computing device to upload the request message, the request payload, and the response payload to the validation computing device; and
    wherein the request message, the request payload, and the response payload are provided in a markup language format.

7. The method of claim 1, wherein the comparisons of the plurality of modified request-payload fields of the modified request payload with the plurality of request-payload fields of the request payload are performed using one or more regular expressions.

8. The method of claim 1:
    wherein the front-end computing device receives a plurality of request messages, the plurality of request messages including the request message; and
    wherein only a portion of the plurality of request messages are provided to the validation computing device.

9. The method of claim 8, wherein the portion of the plurality of request messages that are provided to the validation computing device is determined:
    at random based on a percentage that is configured to throttle a volume of request messages provided to the validation computing device;

based on one or more requesting server computers from which the plurality of request messages are received, the one or more requesting server computers comprising the requesting server computer;

based on one or more processor computers to which a plurality of request payloads generated from the plurality of request messages are transmitted, the one or more processor computers comprising the processor computer; or based on the plurality of request messages.

10. A server computer comprising:

a processor; and a computer-readable medium coupled to the processor, the computer-readable medium including code comprising a first version of a software code, the code executable by the processor for executing the first version of the software code and performing a method comprising:

receiving, from a requesting server computer over a first network, a request message;

generating a request payload using the request message, the request payload having a plurality of request-payload fields;

transmitting the request payload to a processor computer over a second network;

receiving, from the processor computer, a response payload over the second network;

generating a reply message using the response payload for sending to the requesting server computer, the reply message having a plurality of reply-message fields;

providing, to a validation computing device executing in coordination with the server computer, the request message, the request payload, and the response payload, the validation computing device executing a second version of the software code;

wherein the validation computing device:

generates a modified request payload using the request message, the modified request payload having a plurality of modified request-payload fields;

compares the plurality of modified request-payload fields of the modified request payload with the plurality of request-payload fields of the request payload to identify discrepancies between the modified request payload and the request payload corresponding to potential errors in the second version of the software code;

generates a modified reply message using the response payload, the modified reply message having a plurality of modified reply-message fields; and compares the plurality of modified reply-message fields with the plurality of reply-message fields to identify discrepancies between the modified reply message and the reply message corresponding to potential errors in the second version of the software code.

11. The server computer of claim 10, wherein the first version of the software code is replaced with the second version of the software code in response to identifying less than a specified number of discrepancies in the second version of the software code.

12. The server computer of claim 11:

wherein the server computer receives a plurality of request messages over a specified period of time, the plurality of request messages including the request message; and wherein identifying less than the specified number of discrepancies in the second version of the software code comprises identifying less than the specified number of discrepancies in the second version of the software code from the plurality of request messages received over the specified period of time.

13. The server computer of claim 10, wherein the method further comprises:

responsive to determining a discrepancy between the modified reply message and the reply message, generates a log entry or a notification.

14. The server computer of claim 10, wherein, prior to providing the request message, the request payload, and the response payload to the validation computing device, the method further comprises:

transmitting, to the requesting server computer over the first network, the reply message.

15. The server computer of claim 10:

wherein providing the request message, the request payload, and the response payload to the validation computing device comprises invoking, via an asynchronous Hypertext Transfer Protocol (HTTP) call or an asynchronous HTTPS call, a representational state transfer (REST) function of a REST service provided by the validation computing device to upload the request message, the request payload, and the response payload to the validation computing device; and wherein the request message, the request payload, and the response payload are provided in a markup language format.

16. The server computer of claim 10, wherein the comparisons of the plurality of modified request-payload fields of the modified request payload with the plurality of request-payload fields of the request payload are performed using one or more regular expressions.

17. The server computer of claim 10:

wherein the server computer receives a plurality of request messages, the plurality of request messages including the request message; and wherein only a portion of the plurality of request messages are provided to the validation computing device.

18. The server computer of claim 17, wherein the portion of the plurality of request messages that are provided to the validation computing device is determined:

at random based on a percentage that is configured to throttle a volume of request messages provided to the validation computing device;

based on one or more requesting server computers from which the plurality of request messages are received, the one or more requesting server computers comprising the requesting server computer;

based on one or more processor computers to which a plurality of request payloads generated from the plurality of request messages are transmitted, the one or more processor computers comprising the processor computer; or based on the plurality of request messages.

19. A server computer comprising:

a processor; and a computer-readable medium coupled to the processor, the computer-readable medium including code comprising a second version of a software code, the code executable by the processor for executing the second version of the software code and performing a method comprising:

receiving, from a front-end computing device executing in coordination with the server computer, a request message that was received over a first network from a requesting server computer by the front-end computing device, a request payload that was generated by the front-end computing device using the request message, a response payload that was received over a second network from a processor computer by the front-end computing device after the front-end computing device transmitted the request payload over the second network to the processor computer, and a reply message that was generated by the front-end computing device using the response payload, wherein the front-end computing device executes a first version of the software code;

generating a modified request payload using the request message, the modified request payload having a plurality of modified request-payload fields;

comparing the plurality of modified request-payload fields of the modified request payload with a plurality of request-payload fields of the request payload to identify discrepancies between the modified request payload and the request payload corresponding to potential errors in the second version of the software code;

generating a modified reply message using the response payload, the modified reply message having a plurality of modified reply-message fields; and comparing the plurality of modified reply-message fields with a plurality of reply-message fields of the reply message to identify discrepancies between the modified reply message and the reply message corresponding to potential errors in the second version of the software code.

20. The server computer of claim 19, wherein the first version of the software code at the front-end computing device is replaced with the second version of the software code in response to identifying less than a specified number of discrepancies in the second version of the software code.

* * * * *